(12) United States Patent
Yun et al.

(10) Patent No.: US 8,928,762 B2
(45) Date of Patent: Jan. 6, 2015

(54) DIGITAL PHOTOGRAPHING APPARATUS AND METHOD OF CONTROLLING SLEEP MODE THEREOF

(75) Inventors: Jae-mu Yun, Hwaseong-si (KR); Jin-gi Lee, Changwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 577 days.

(21) Appl. No.: 13/190,618

(22) Filed: Jul. 26, 2011

(65) Prior Publication Data

US 2012/0026348 A1 Feb. 2, 2012

(30) Foreign Application Priority Data

Jul. 28, 2010 (KR) ........................ 10-2010-0072976

(51) Int. Cl.
*H04N 5/228* (2006.01)
*H04N 5/232* (2006.01)
*G03B 7/26* (2006.01)

(52) U.S. Cl.
CPC .............. *H04N 5/23241* (2013.01); *G03B 7/26* (2013.01); *H04N 5/23258* (2013.01); *H04N 5/23287* (2013.01); *G03B 2217/005* (2013.01); *G03B 2217/007* (2013.01)
USPC .............. 348/208.16; 348/208.2; 348/208.11; 348/208.12

(58) Field of Classification Search
CPC ....................... H04N 5/23241; H04N 5/23245
USPC ........ 348/208.12, 208.16, 372, 208.2, 208.11
See application file for complete search history.

(56) References Cited

U.S. PATENT DOCUMENTS

| | | | |
|---|---|---|---|
| 6,470,147 B1* | 10/2002 | Imada | 396/55 |
| 7,430,367 B2* | 9/2008 | Imada | 396/55 |
| 7,680,403 B2* | 3/2010 | Okumura et al. | 396/55 |
| 7,720,376 B2* | 5/2010 | Weinberg et al. | 396/301 |
| 8,355,052 B2* | 1/2013 | Uenaka | 348/208.2 |
| 8,553,095 B2* | 10/2013 | Lee | 348/208.16 |
| 2010/0245605 A1* | 9/2010 | Sakurai | 348/208.99 |

* cited by examiner

*Primary Examiner* — Ngoc-Yen Vu
(74) *Attorney, Agent, or Firm* — Drinker Biddle & Reath LLP

(57) ABSTRACT

In an embodiment, when a sleep mode is turned off, if vibration less than a limit value occurs, the sleep mode is turned on and a hand shake correction unit is turned off so that power consumption may be reduced. Moreover, when the sleep mode is turned on, if vibration greater than a limit value occurs, the sleep mode is turned off and the hand shake correction unit is turned on so that an image blur does not occur. In another embodiment, when the sleep mode is turned off, if vibration less than a limit value occurs, the hand shake correction unit is turned on in the state where the sleep mode is turned on and a HPF is turned on so that an image blur is prevented from occurring due to a shock caused by pushing a release button or shock caused by opening or closing a shutter.

22 Claims, 15 Drawing Sheets

DIGITAL PHOTOGRAPHING APPARATUS AND METHOD OF CONTROLLING SLEEP MODE THEREOF

CROSS-REFERENCE TO RELATED PATENT APPLICATIONS

This application claims the benefit of Korean Patent Application No. 10-2010-0072976, filed on Jul. 28, 2010, in the Korean Intellectual Property Office, the entire disclosure of which is incorporated herein by reference.

BACKGROUND

1. Field of the Invention

The invention relates to a digital photographing apparatus including a hand shake correction unit and a method of controlling a sleep mode of the digital photographing apparatus.

2. Description of the Related Art

FIG. 1 illustrates an image blur that requires hand shake correction. As the speed of a shutter of a digital camera is decreased or a zoom magnification of the digital camera is increased, i.e., when the digital camera has is zooming in on a subject, an image shake due to a user's hand shake becomes severe. For example, when the speed of the shutter of the digital camera is slower than a reciprocal of a focal length of a lens of the digital camera, hand shake correction is needed. When a focal length between the lens of the digital camera and an image sensor is 200 mm, and the speed of the shutter of the digital camera is slower than $1/200$ seconds, then hand shake correction is needed. However, hand shake correction may consume a lot of power, and digital cameras are often mobile and with limited batteries.

SUMMARY

Therefore there is a need in the art for a digital photographing apparatus including a hand shake correction unit that prevents a shake of an image and has low power consumption by controlling when a hand shake correction unit is turned on according to whether a sleep mode is turned on or off, and a method of controlling the sleep mode of the digital photographing apparatus.

According to an aspect of the invention, there is provided a method of controlling a sleep mode of a digital photographing apparatus comprising a hand shake correction unit, the method comprising: measuring a vibration degree of the digital photographing apparatus; checking whether the sleep mode of the digital photographing apparatus is turned on or off; as a result of checking, if the sleep mode is turned off, comparing the vibration degree measured for a first time with a first limit value; as a result of comparison, if the vibration degree is less than the first limit value, turning on the sleep mode; as a result of checking, if the sleep mode is turned on, comparing the vibration degree measured for a second time with a second limit value; and as a result of comparison, if the vibration degree is greater than the second limit value, turning off the sleep mode.

If the sleep mode is turned on, the hand shake correction unit may be turned off, and if the sleep mode is turned off, the hand shake correction unit may be turned on.

If the sleep mode is turned on, the hand shake correction unit may be turned on in a state where a high pass filter (HPF) is turned on, and if the sleep mode is turned off, the hand shake correction unit may be turned on in a state where the HPF is turned off.

The HPF may be included in the hand shake correction unit, and the hand shake correction unit may operate only for a shock caused by pushing a release button or a shock caused by opening or closing a shutter.

The vibration degree may be determined based on a difference between a maximum angular velocity and a minimum angular velocity, and the vibration degree may comprise a vibration degree in an x-axis direction and a vibration degree in a y-axis direction.

The comparing of the measured vibration degree with the second limit value may comprise comparing the vibration degree in the x-axis direction with the second limit value.

The degree of vibration may be determined based on a difference between a maximum angular velocity and a minimum angular velocity, and the vibration degree may comprise only a vibration degree in the x-axis direction.

The first time may be longer than the second time.

The first limit value may be less than the second limit value.

The method may further comprise, if the sleep mode is turned off and the hand shake correction unit is turned on: extracting information regarding a current position of a lens, wherein the extracting of information is performed by the hand shake correction unit; and starting performing of a hand shake correction operation based on the extracted current position of the lens, wherein the performing of the hand shake correction operation is performed by the hand shake correction unit.

The method may (after measuring the vibration degree,) further comprise: removing noise included in the vibration degree by using a low pass filter (LPF).

According to another aspect of the invention, there is provided a digital photographing apparatus comprising a hand shake correction unit, the digital photographing apparatus comprising: a vibration detection sensor included in the hand shake correction unit and for measuring a vibration degree of the digital photographing apparatus; a checking unit checking whether the sleep mode of the digital photographing apparatus is turned on or off; a comparison unit, as a result of checking, if the sleep mode is turned off, comparing of the vibration degree measured for a first time with a first limit value, and as a result of checking, if the sleep mode is turned on, comparing of the vibration degree measured for a second time with a second limit value; and a controller, as a result of comparison, if the vibration degree measured for the first time is less than the first limit value, turning on the sleep mode, and as a result of comparison, if the vibration degree measured for the second time is greater than the second limit value, turning off the sleep mode.

If the sleep mode is turned on, the controller may turn off the hand shake correction unit, and if the sleep mode is turned off, the controller may turn on the hand shake correction unit.

If the sleep mode is turned on, the controller may turn on the hand shake correction unit in a state where a high pass filter (HPF) is turned on, and if the sleep mode is turned off, the controller may turn on the hand shake correction unit in a state where the HPF is turned off.

The HPF may be included in the hand shake correction unit, and the hand shake correction unit may operate only for a shock caused by pushing a release button or a shock caused by opening or closing a shutter.

The vibration degree may be determined based on a difference between a maximum angular velocity and a minimum angular velocity, and the vibration degree may comprise a vibration degree in an x-axis direction and a vibration degree in a y-axis direction.

The comparison unit may compare the vibration degree in the x-axis direction with the second limit value.

The degree of vibration may be determined based on a difference between a maximum angular velocity and a minimum angular velocity, and the vibration degree may comprise only a vibration degree in the x-axis direction.

The first time may be longer than the second time.

The first limit value may be less than the second limit value.

The digital photographing apparatus may further comprise a position detection sensor extracting information regarding a current position of a lens included in the digital photographing apparatus, wherein the hand shake correction unit starts to perform a hand shake correction operation based on the extracted current position of the lens extracted by the position detection sensor after the sleep mode is turned off.

The digital photographing apparatus may further comprise a low pass filter (LPF) included in the hand shake correction unit and for removing noise included in the vibration degree of the digital photographing apparatus.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
FIG. 1 illustrates an image blur that requires hand shake correction.

The invention according to certain embodiments of the invention will be described below in more detail with reference to the accompanying drawings. Those components that are the same or are in correspondence are rendered the same reference numeral regardless of the figure number, and redundant explanations are omitted.

Figure 2A:
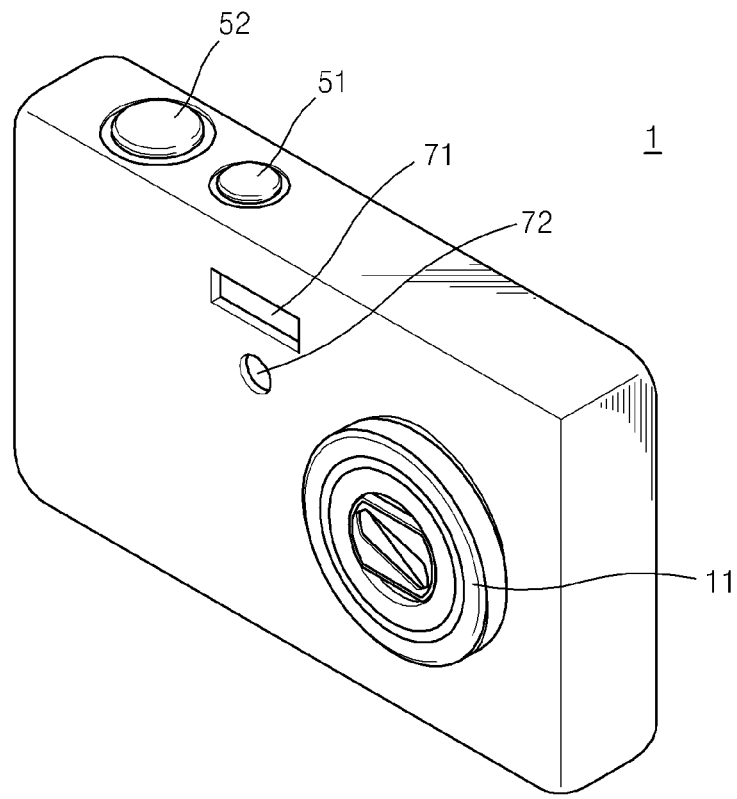
FIG. 2A is a perspective view of an external surface of a digital photographing apparatus as a digital camera, according to an embodiment of the invention.
Figure 2B:
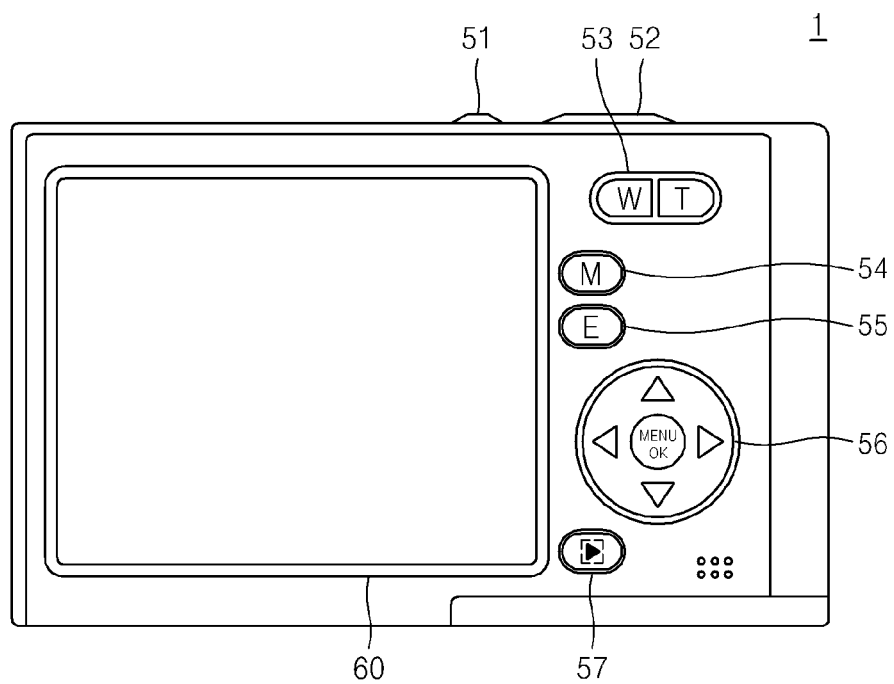
FIG. 2B is a rear view of the digital camera.

FIG. 2A is a perspective view of an external surface of a digital photographing apparatus as a digital camera, according to an embodiment of the invention, and FIG. 2B is a rear view of the digital camera.

A digital camera 1 according to an embodiment of the digital photographing apparatus of the invention will now be described. However, the digital photographing apparatus is not limited to the digital camera 1 and may be a compact digital camera, a single lens reflex camera, a hybrid camera that has advantages of both the compact digital camera and the single lens reflex camera, a camera phone, a personal digital assistant (PDA), a portable multimedia player (PMP), or the like.

Referring to FIGS. 2A and 2B, the digital camera 1 includes a lens unit 11, a flash 71, an auxiliary light emitting unit 72, a release button 52, and a power button 51 disposed on front and top surfaces thereof. Also, several buttons as input units and a display unit 60 are disposed on a rear surface of the digital camera 1.

Light from a subject is passed through the lens unit 11 and is collected as an optical signal by an image capture unit (not shown). The flash 71 instantaneously emits light before an image is to be captured in a dark place to brighten the dark place, and examples of flash modes are an automatic flash mode, a compulsive light emitting mode, a light emitting inhibiting mode, a red-eye mode, and a slow synchro mode. The auxiliary light emitting unit 72 emits auxiliary light to the subject so that the digital camera 1 may automatically focus on a subject quickly and correctly when there is an insufficient amount of light or when capturing a night shot. The release button 52 generates an image shooting signal when fully pressed by a user. When the user half presses the release button 52 to input a semi-shutter signal 51, the digital camera 1 focuses on the subject and controls the amount of light. When the subject is focused on and the amount of light is controlled, the user may capture an image by completely pressing the release button 52 to input a complete shutter signal S2. The power button 51 is an input button disposed on an upper portion of the digital camera 1 and controls supply of power for operating the digital camera 1 to the digital camera 1. The input units include various key buttons and are used to control functions of the digital camera 1. The input unit includes a wide-zoom button 53W, a tele-zoom button 53T, functional buttons 54, 55, and 56, a playback button 57, and the like. The display unit 60 includes a liquid crystal display (LCD) (panel) or an organic light-emitting display panel, a field emission display (FED), and the like. The display unit 60 displays status information of the digital camera 1 or a captured image.

Figure 3:
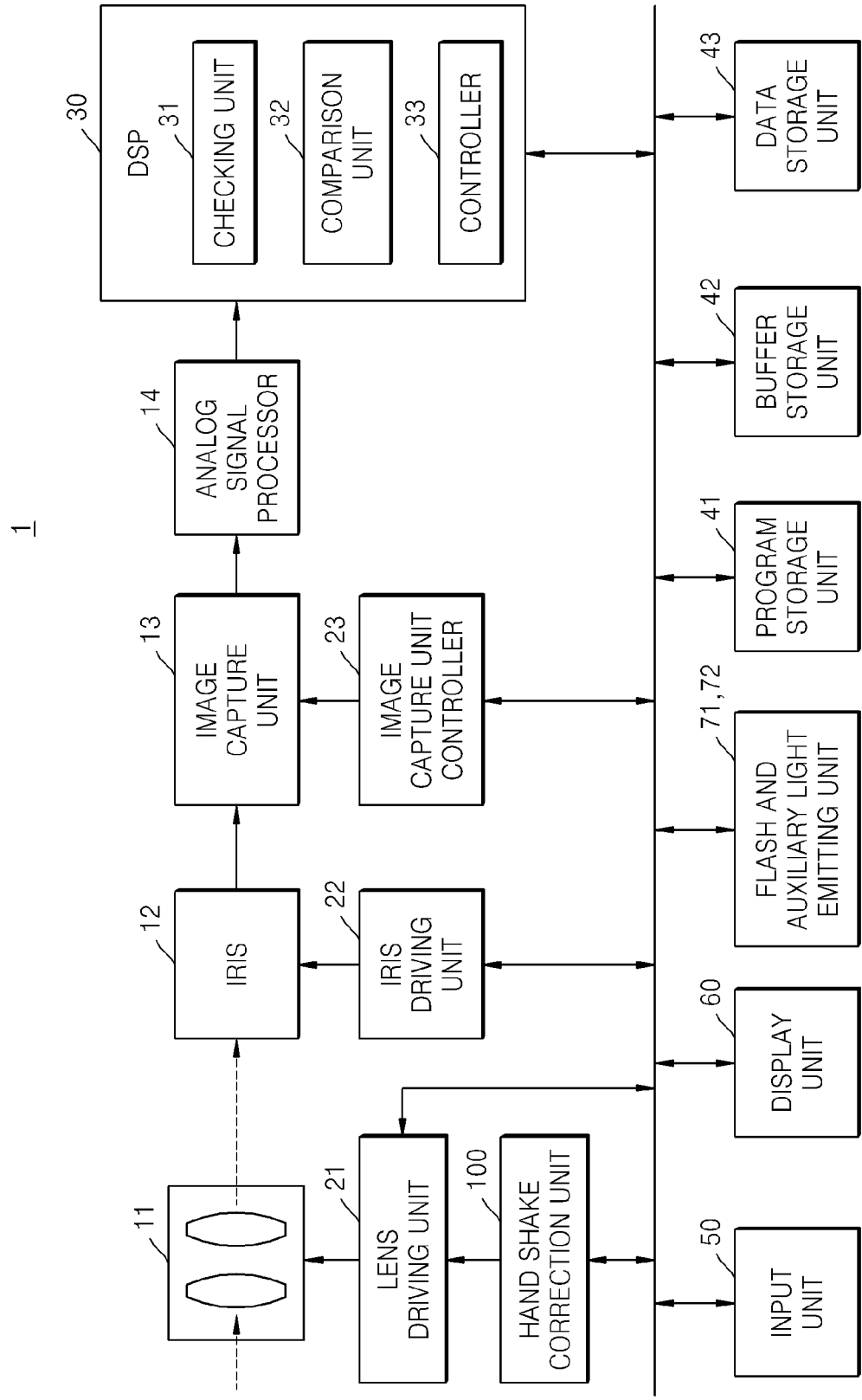
FIG. 3 is a block diagram of the digital camera illustrated in FIGS. 2A and 2B.

FIG. 3 is a block diagram of the digital camera 1 illustrated in FIGS. 2A and 2B. Referring to FIG. 3, the digital camera 1 may include the lens unit 11, a lens driving unit 21, an iris 12, an iris driving unit 22, a hand shake correction unit 100, an image capture unit 13, an image capture unit controller 23, an analog signal processor 14, a program storage unit 41, a buffer storage unit 42, a data storage unit 43, a display unit 60, a digital signal processor (DSP) 30, an input unit 50, a flash 71, and an auxiliary light emitting unit 72. The display unit 60, the flash 71, and the auxiliary light emitting unit 72 have been described with reference to FIGS. 2A and 2B, and thus, the description thereof described above will not be repeated here.

The lens unit 11 collects an optical signal. The lens unit 11 may include a zoom lens that controls increase or decrease of a viewing angle according to a focal length, a focus lens that focuses on a subject, and the like. The zoom lens and the focus lens may each be formed as one lens or as a group formed of a plurality of lenses.

The iris 12 controls the amount of light incident on the image capture unit 13 by controlling a degree at which the iris 12 is opened or closed.

The lens driving unit 21 and the iris driving unit 22 drive the lens unit 11 and the iris 12, respectively, in response to a control signal supplied by the DSP 30. The lens driving unit 21 may control the focal length by controlling the position of the focus lens, may perform auto-focusing and focus change, and may perform zoom change by controlling the position of the zoom lens. In addition, the position of a lens may be controlled according to a control signal supplied by the hand shake correction unit 100. The iris driving unit 22 controls the degree at which the iris 12 is opened or closed and controls an F-number, thereby performing auto-focusing, automatic exposure correction, focus change, depth of field control, and the like.

The hand shake correction unit 100 controls the lens driving unit 21 to move one or more lenses. For example, the hand shake correction unit 100 may move a focus lens in an opposite direction to a direction in which the user's hand shakes, by detecting the user's hand shake. A detailed description of the hand shake correction unit 100 will be described later with reference to FIG. 4.

An optical signal that is passed through the lens unit 11 forms an image of a subject when reaching a light receiving surface of the image capture unit 13 and the image capture unit 13 outputs an analog signal corresponding to the optical signal. The image capture unit 13 may be a charge coupled device (CCD) that converts an optical signal into an electrical signal, a complementary metal oxide semiconductor image sensor (CIS), a high-speed image senor, or the like. The sensitivity of the image capture unit 13 may be controlled by the image capture unit controller 23. The image capture unit controller 23 may control the image capture unit 13 according to a control signal that is automatically generated by an image signal input in real-time or a control signal that is manually input by the user's manipulation. In addition, the digital camera 1 may include a mechanical shutter that moves a shield upwards and downwards (not shown).

The analog signal processor 14 generates a digital image signal by performing noise reduction processing, gain control, waveform shaping, analog-digital conversion, or the like on an analog signal supplied by the image capture unit 13.

The input unit 50 inputs a control signal from the user. The input unit 50 has been already described with reference to FIG. 2, and thus, the description thereof described above will not be repeated here. The input unit 50 may have various key button forms, as illustrated in FIG. 2B. However, the invention is not limited thereto, and the input unit 50 may be any form that allows the user to input a signal, such as a keyboard, a touch pad, a touch screen, a remote controller, or the like.

In addition, the digital camera 1 includes an operating system that drives the digital camera 1, a program storage unit 41 that stores a program of an application system or the like, a buffer storage unit 42 that temporarily stores necessary data for performing operations or resultant data, and a data storage unit 43 that stores various necessary information for the program as well as an image file including an image signal.

The digital camera 1 includes the digital signal processor (DSP) 30, which processes a digital image signal input by the analog signal processor 14 and controls each of elements of the digital camera 1 according to an external input signal. The DSP 30 may perform image signal processing for improving image quality, such as noise reduction on an input image signal, gamma correction, color filter array interpolation, color matrix, color correction, color enhancement, or the like. In addition, the digital camera 1 may generate an image file by compressing image data that is generated by performing image signal processing for improvement image quality or may restore image data from the generated image file. The compressed image file may be stored in the data storage unit 43. In addition, the DSP 30 may generate a control signal for controlling zoom change, focus change, automatic exposure correction, or the like, by executing the program stored in the program storage unit 41, may provide the control signal to the hand shake correction unit 100, the lens driving unit 21, the iris driving unit 22, and the image capture unit controller 23, and may control the overall operations of the lens unit 11, the iris 12, and the image capture unit 13. According to an embodiment of the invention, the DSP 30 may include a checking unit 31 that checks whether a sleep mode is turned on or off, a comparison unit 32 that compares a hand shake degree measured by a vibration detection sensor included in the hand shake correction unit 100 to a first limit value or a second limit value, and a controller 33 that turns on or off the sleep mode according to a result of comparison of the comparison unit 32. Operations of the checking unit 31, the comparison unit 32, and the controller 33 will be described later with reference to the flowchart of FIG. 5 in detail.

Figure 4:
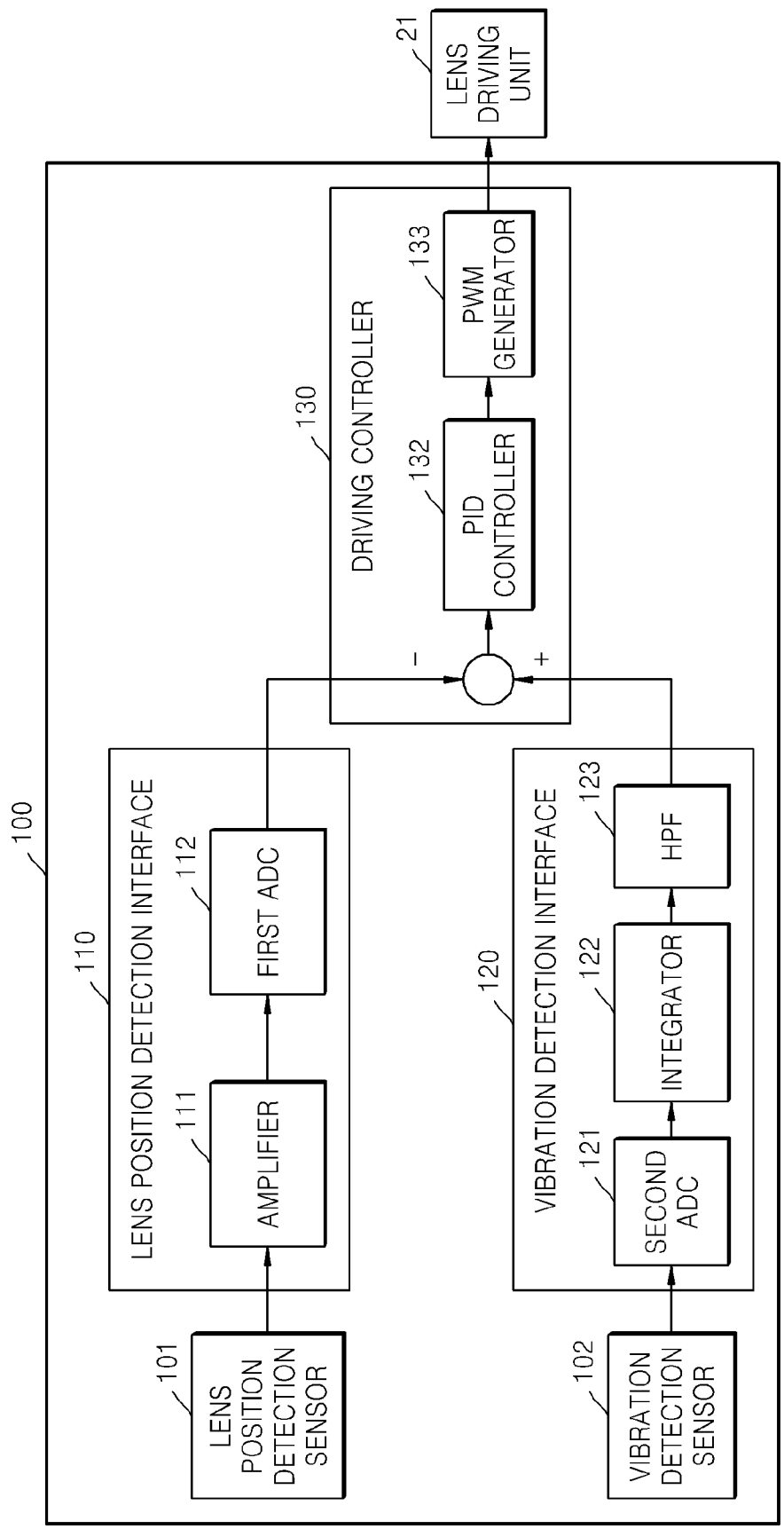
FIG. 4 is a block diagram of a hand shake correction unit illustrated in FIG. 3.

FIG. 4 is a detailed block diagram of the hand shake correction unit 100 illustrated in FIG. 3.

Referring to FIG. 4, the hand shake correction unit 100 may include a vibration detection sensor 102, a vibration detection interface 120, a lens position detection sensor 101, a lens position detection interface 110, and a driving controller 130. The hand shake correction unit 100 controls the lens driving unit 21 to move the lens in an opposite direction to a direction in which the user's hand shakes, by detecting the user's hand shake by using the vibration detection sensor 102.

The vibration detection sensor 102 detects vibration of the digital camera 1. The vibration detection sensor 102 may be a gyro sensor. The lens driving unit 21 moves the lens in correspondence to a vibration degree detected by the vibration detection sensor 102. In other words, the lens driving unit 21 corrects image blur due to a hand shake. The lens driving unit 21 may be a voice coil motor (VCM), a piezo motor, a stepping motor, or the like. For example, when the lens driving unit 21 is a VCM, the VCM may be mounted in a position in which the VCM may surround the lens unit 11, so as to move the lens. The lens driving unit 21 may further include a motor driver (not shown) that drives the VCM, as well as the VCM.

The vibration detection interface 120 converts a vibration degree detected by the vibration detection sensor 102 into an analog signal for controlling the lens driving unit 21. The vibration detection interface 120 may include a second analog-to-digital converter (ADC) 121, an integrator 122, and a high pass filter (HPF) 123. The second ADC 121 converts an output of the vibration detection sensor 102 into a digital signal. The integrator 122 performs an integration operation for converting an angular velocity into an angular value when the vibration detection sensor 102 is a gyro sensor. The integrator 122 may apply a signal that is obtained by performing an integration operation on a digital signal output by the second ADC 121 to the HPF 123. The HPF 123 filters a signal output by the integrator 122 so as to slowly move the lens, only for vibrations of a predetermined size. A signal that passes through the HPF 123 is a target value for controlling the lens driving unit 21. According to an embodiment of the invention, the HPF 123 may be turned on or off. First, when the HPF 123 is turned off, a signal that is obtained by performing an integration operation on a digital signal output by the second ADC 121 is a target value for controlling the lens driving unit 21. In other words, when the HPF 123 is turned off, the hand shake correction unit 100 performs a hand shake correction operation on all vibrations. Next, when the HPF 123 is turned on, the hand shake correction unit 100 performs a hand shake correction operation only for vibrations having a predetermined size according to a cut off frequency of the HPF 123. For example, when the cut off frequency of the HPF 123 is 3 to 8 Hz, the hand shake correction unit 100 may operate only for a shock caused by pushing the release button 52 or a shock caused by opening or closing the shutter.

The lens position detection sensor 101 detects the position of the lens in real-time. The lens position detection sensor 101 may be a hall sensor. The lens position detection sensor 101 applies a signal generated according to the detected position of the lens to the lens position detection interface 110. The lens position detection interface 110 may include an amplifier 111 and a first ADC 112. The amplifier 111 may amplify a signal that is output by the lens position detection sensor 101 by a factor of several tens. The amplifier 111 may be an operational amplifier. The first ADC 112 converts a signal that passes through the amplifier 111 into a digital signal.

The driving controller 130 generates a control signal that corresponds to a difference between a digital signal output by the vibration detection interface 120 and a digital signal output by the lens position detection interface 110, so as to control the lens driving unit 21. The driving controller 130 may include a proportional-integral-differential (PID) controller 132 that performs a proportional, integral, and differential operation on the difference between the two digital signals, and a pulse width modulation (PWM) generator 133 that converts a signal operated on by the PID controller 132 into a PWM signal. The lens driving unit 21 drives a motor driver (not shown) according to a signal generated by the driving controller 130 so as to move the position of the lens.

According to an embodiment of the invention, the DSP 30 may control turn on/off of the hand shake correction unit 100 and the HPF 123 described above depending on whether the sleep mode is turned on or off. In addition, the DSP 30 determines whether to turn the sleep mode on or off according to a vibration degree detected by the vibration detection sensor 102, and thus may receive a signal corresponding to the vibration degree from the vibration detection sensor 102. Hereinafter, a method of controlling the sleep mode according to an embodiment of the invention will be described in detail.

First, the sleep mode according to the invention refers to a mode in which an element of the digital camera 1 is controlled according to a vibration degree obtained by the vibration detection sensor 102. In this regard, the element may be the hand shake correction unit 100 or the HPF 123, the display unit 60, the flash 71, or the like. According to one aspect of the invention, when the sleep mode is turned on, the hand shake correction unit 100 may be turned off, and when the sleep mode is turned off, the hand shake correction unit 100 may be turned on. However, according to another aspect of the invention, when the sleep mode is turned on, the hand shake correction unit 100 may be turned on when the HPF 123 is turned on, and when the sleep mode is turned off, the hand shake correction unit 100 may be turned on when the HPF 123 is turned off.

For example, it is assumed that the sleep mode is a mode in which the hand shake correction unit 100 is turned on/off based on the whether the sleep mode is on or off. For example, when the sleep mode is turned on, then the hand shake correction unit 100 is turned off. The case when the digital camera 1 is put on a tripod will now be described. In this case, the sleep mode is easily turned off due to vibration inside the digital camera 1 and thus the hand shake correction unit 100 may be frequently turned on. Thus, a limit value for preventing the sleep mode from being easily turned off needs to be set. According to an embodiment of the invention, a method of more reasonably controlling the sleep mode by providing a limit value is provided. According to another aspect of the invention, for example, when the sleep mode is turned on, the hand shake correction unit 100 is turned off without any exception and thus an image blur may frequently occur due to a shock caused by pushing the release button 52 or a shock caused by opening or closing the shutter. Thus, for specific vibrations, turning on or off the hand shake correction unit 100 in the sleep mode needs to be controlled differently. According to another embodiment of the invention, a method of controlling the sleep mode whereby turning on or off of the HPF 123 is reasonably controlled is provided.

Figure 5:
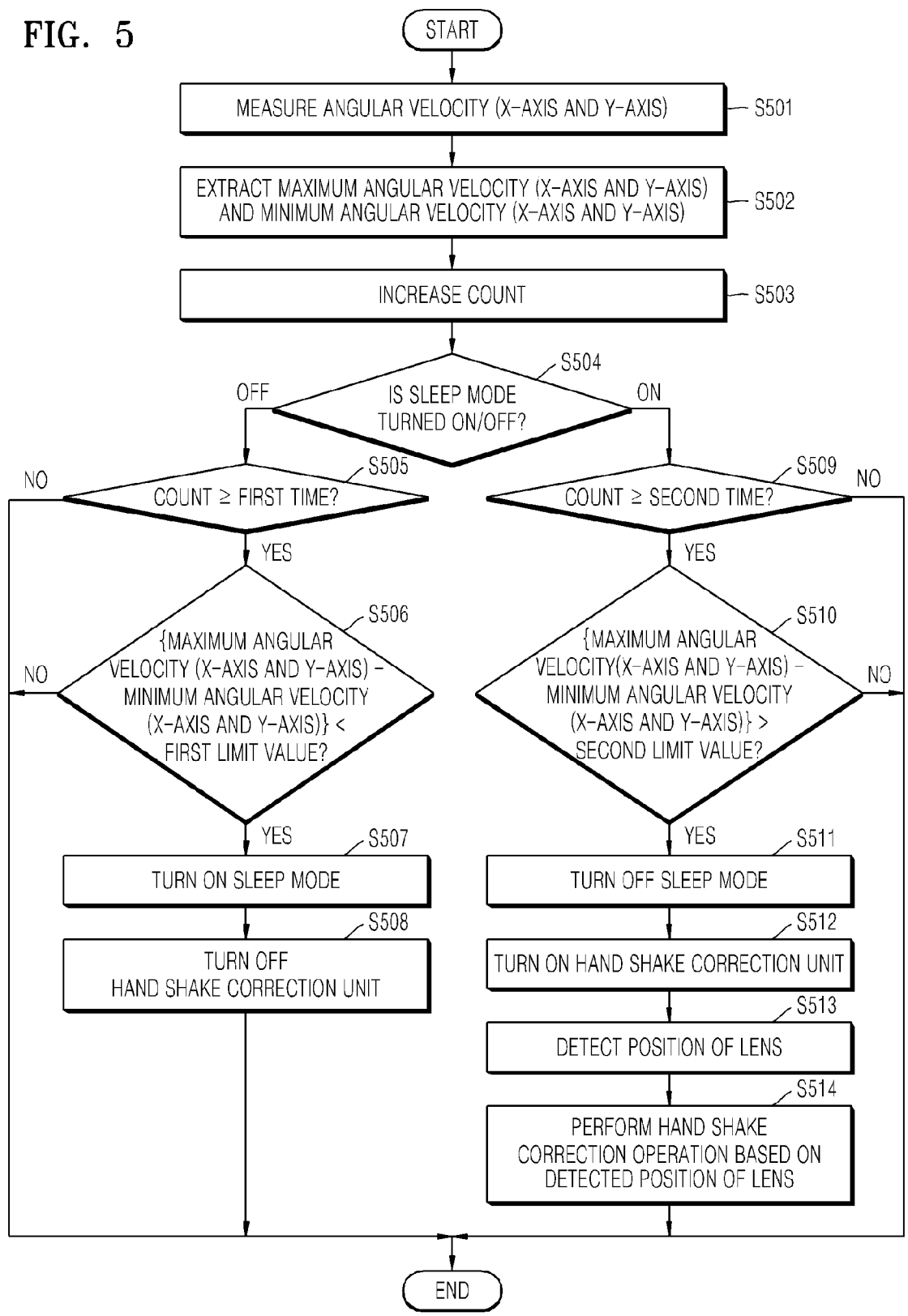
FIG. 5 is a flowchart illustrating a method of controlling a sleep mode, according to an embodiment of the invention.

First, a method of more reasonably controlling the sleep mode by providing a limit value will be described with reference to FIG. 5. FIG. 5 is a flowchart illustrating a method of controlling a sleep mode, according to an embodiment of the invention.

Referring to FIG. 5, first, a vibration degree is detected by the vibration detection sensor 102 (Operation S501). In this regard, the vibration degree may be the size of an angular velocity ANGVEL. Also, the vibration degree may include a vibration degree in an x-direction and a vibration degree in a y-direction. In detail, an x-axis angular velocity and a y-axis angular velocity ANGVEL x & y may be used.

Next, a maximum angular velocity and a minimum angular velocity are extracted from the vibration degree (Operation S502). This is done in order to compare a limit value, a maximum angular velocity MAX ANGVEL, and a minimum angular velocity MIN ANGVEL to each other in a subsequent operation. For example, the maximum angular velocity MAX ANGVEL and the minimum angular velocity MIN ANGVEL may be continuously updated while an angular velocity is continuously measured and stored for various times. Specifically, when a measured angular velocity is greater than the stored maximum angular velocity MAX ANGVEL, the measured angular velocity becomes the maximum angular velocity MAX ANGVEL. In the same manner, when a measured angular velocity is less than stored minimum angular velocity MIN ANGVEL, the measured angular velocity becomes the minimum angular velocity MIN ANGVEL. However, the invention is not limited thereto, and the maximum angular velocity MAX ANGVEL and the minimum angular velocity MIN ANGVEL may be extracted from the vibration degree by using various methods.

Next, a count is increased by a predetermined size so as to measure the vibration degree of the digital camera 1 for a predetermined amount of time (Operation S503). This will be described later, and the predetermined amount of time may be a first time TIME#1 or a second time TIME#2. In detail, the first time TIME#1 may be about 1.5 seconds, and the second time TIME#2 may be about 0.3 seconds. For example, the count may be increased in units of 0.1 seconds, but the invention is not limited thereto.

Next, the checking unit 31 of the DSP 30 checks whether the sleep mode of the digital camera 1 is turned on or off (Operation S504). This is because a limit value and a predetermined amount of time required for measuring an angular velocity may be varied according to the current status of the sleep mode. By checking the current status of the sleep mode and applying a limit value that is suitable for the current status of the sleep mode, the sleep mode may be controlled quickly and correctly. The order of the checking whether the sleep mode is turned on/off (Operation S504) and the increasing of count (Operation S503) may be changed.

If the checking unit 31 determines that the sleep mode is turned off, the comparison unit 32 compares the vibration degree measured for the first time TIME#1 with a first limit value LIMIT#1. Thus, it is checked whether the count is greater than or equal to the first time TIME#1 (Operation S505). In this regard, the first time TIME#1 may be a time required to measure an angular velocity for entering the sleep mode and may be about 1.5 seconds. If the count is less than the first time TIME#1, controlling of the sleep mode is stopped, and if the count is greater than or equal to the first time TIME#1, the vibration degree measured for the first time TIME#1 is compared with the first limit value LIMIT#1 (Operation S506). In this regard, the vibration degree may be a difference between a maximum angular velocity and a minimum angular velocity measured for the first time TIME#1. In detail, a difference between a maximum angular velocity and a minimum angular velocity in the x-axis direction {MAX ANGVEL X−MIN ANGANGVEL X} and a difference between a maximum angular velocity and a minimum angular velocity in the y-axis direction {MAX ANGVEL Y−MIN ANGANGVEL Y} may be respectively compared with the first limit value LIMIT#1. The first limit value LIMIT#1 may be greater than an angular velocity due to internal vibration. The reason for this is so that the sleep mode is not easily turned off due to internal vibration. The first limit value LIMIT#1 may be in units of degree/sec or rad/sec. The first limit value LIMIT#1 may be set by the user or may be a value that has been previously programmed and stored when the digital camera 1 is manufactured.

As a result of comparison by the comparison unit 32, if the vibration degree is less than the first limit value LIMIT#1, the controller 33 turns on the sleep mode (Operation S507). According to an embodiment of the invention, when the sleep mode is turned on, the hand shake correction unit 100 is turned off (Operation S508), and a hand shake correction operation is stopped. Although not shown, the controller 33 may set the maximum angular velocity to 0 so as to initialize the maximum angular velocity and may set the minimum angular velocity to 0 so as to initialize the minimum angular velocity. The controller 33 may also set the count to 0 so as to initialize the count.

If the checking unit 31 determines that the sleep mode is turned on, the comparison unit 32 compares the vibration degree measured for the second time TIME#2 with a second limit value LIMIT#2. Thus, it is checked whether the count is greater than or equals to the second time TIME#1 (Operation S509). In this regard, the second time TIME#2 may be a time required to measure an angular velocity for releasing the sleep mode and may be about 0.3 seconds. In this regard, the second time TIME#2 is shorter than the first time TIME#1. The reason for this is that the sleep mode should be quickly released. If the count is less than the second time TIME#2, controlling of the sleep mode is stopped, and if the count is greater than or equals to the second time TIME#2, the vibration degree measured for the second time TIME#2 is compared with the second limit value LIMIT#2 (Operation S510). In this regard, the vibration degree may be a difference between a maximum angular velocity and a minimum angular velocity measured for the second time TIME#2. In detail, both a difference between a maximum angular velocity and a minimum angular velocity in the x-axis direction and a difference between a maximum angular velocity and a minimum angular velocity in the y-axis direction may be compared with the second limit value LIMIT#2. In this regard, the second limit value LIMIT#2 is greater than the first limit value LIMIT#1. The second limit value LIMIT#2 may be less than an angular velocity when the user grips the digital camera 1. The reason for this is that the sleep mode may be easily turned off when the user lifts the digital camera 1. The second limit value LIMIT#2 may be in units of degree/sec or rad/sec. The second limit value LIMIT#2 may be set by the user or may be a value that has been previously programmed and stored when the digital camera 1 is manufactured.

As a result of comparison of the comparison unit 32, if the vibration degree is greater than the second limit value LIMIT#2, the controller 33 turns off the sleep mode (Operation S511). According to an embodiment of the invention, when the sleep mode is turned off, the hand shake correction unit 100 is turned on (Operation S512), and a hand shake correction operation starts to be performed.

Figure 6:
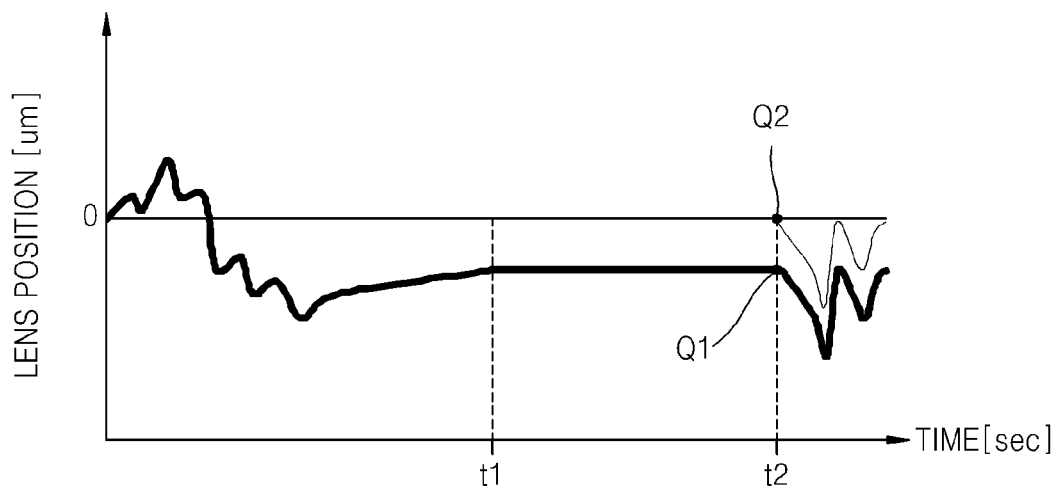
FIG. 6 is a graph for explaining an operation illustrated in FIG. 5.

When the hand shake correction unit 100 starts to perform the hand shake correction operation, the hand shake correction unit 100 detects the current position of the lens, by using the lens position detection sensor 101 (Operation S513). Next, the hand shake correction operation starts to be performed based on the detected current position of the lens (Operation S514). If the hand shake correction operation does not start to be performed based on the current position of the lens, a skipping may occur on a screen in a live view mode. FIG. 6 illustrates Operation S513 illustrated in FIG. 5. Referring to FIG. 6, an x-axis represents time, and the y-axis represents the position of the lens, and an initial/normal position of the lens is indicated by 0. Since the user grips the digital camera 1 before a time t1, the position of the lens is frequently changed. However, since the digital camera 1 is put on the tripod in a time period between the time t1 and a time t2, the position of the lens is fixed. The digital camera 1 is lifted from the tripod after t2. In this case, the sleep mode is turned off, and the hand shake correction unit 100 operates. In this regard, a hand shake correction should start to be performed based on a position Q1 at which shake of the lens is stopped. If the hand shake correction operation starts to be performed based on Q2, that is, the initial/normal position of the lens, due to a difference in the position of the lens, impact sound and skipping may occur in the live view mode of the digital camera 1.

Although not shown, the controller 33 may set the maximum angular velocity to 0 so as to initialize the maximum angular velocity and may set the minimum angular velocity to 0 so as to initialize the minimum angular velocity. Also, the controller 33 may set the count to 0 so as to initialize the count.

Figure 7:
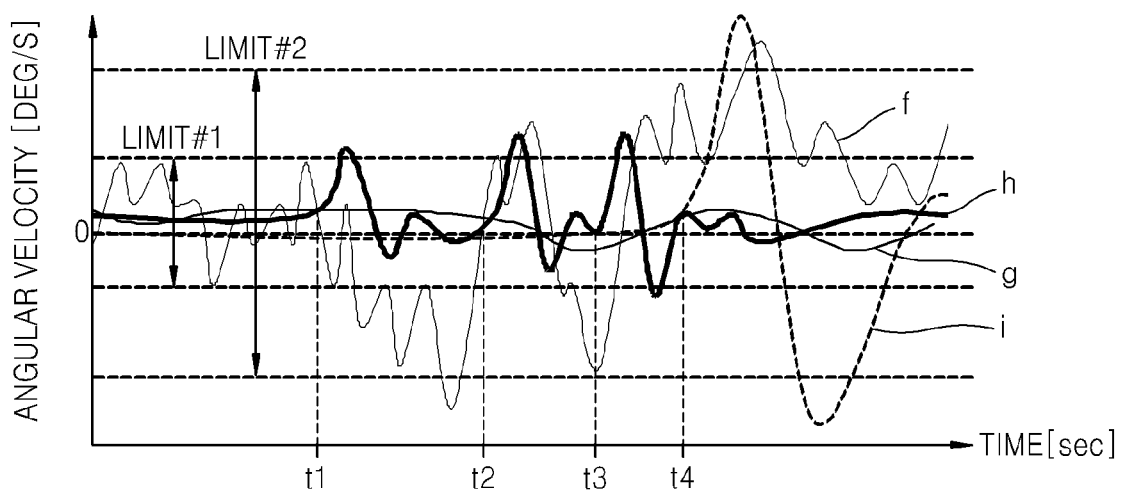
FIG. 7 is a graph showing a change in angular velocity of the digital camera of FIGS. 2A and 2B according to time.

FIG. 7 is a graph showing a change in an angular velocity of the digital camera 1 of FIGS. 2A and 2B according to time.

Referring to FIG. 7, the x-axis represents time, and the y-axis represents angular velocity. FIG. 7 is a graph showing an angular velocity converted into a digital signal. FIG. 7 shows illustrates four graphs plotted together as f, h, g, and i based on when the angular velocity is 0. The graph f shows the angular velocity when the user grips the digital camera 1. In the graph f, a change in the angular velocity is very large. The graph g shows the angular velocity when the digital camera 1 is just put on the tripod. In the graph g, a change in the angular velocity is very small. The graph h shows the angular velocity when the digital camera 1 is put on the tripod and photographing is performed by pressing the release button 52. The graph i shows the angular velocity when the user lifts the digital camera 1 from the tripod. Additionally, the sizes of the first limit value LIMIT#1 and the second limit value LIMIT#2 are indicated in FIG. 7. The graph f and g are used as a reference for explaining the graphs h and i, and thus, a detailed description thereof will not be repeated here.

Referring to FIGS. 5 and 7, when a vibration degree is less than the first limit value LIMIT#1 for the first time TIME#1, the sleep mode is turned on, and the hand shake correction unit 100 is turned off. In addition, when the vibration degree is greater than the second limit value LIMIT#2 for the second time TIME#2, the sleep mode is turned off, and the hand shake correction unit 100 is turned on.

The graphs h and i will be described on the assumption that the sleep mode is turned on at time 0. In the graph h, since a difference between a maximum angular velocity and a minimum angular velocity is less than the second limit value LIMIT#2 from a time t1 at which the user half presses the release button 52 to the second time TIME#2, the sleep mode is not released. In addition, since a difference between a maximum angular velocity and a minimum angular velocity is less than the second limit value LIMIT#2 from a time t2 at which the user completely presses the release button 52 to the second time TIME#2, the sleep mode is not released. Last, since a difference between a maximum angular velocity and a minimum angular velocity is less than the second limit value LIMIT#2 from a time t3 at which the shutter starts to operate to the second time TIME#2, the sleep mode is not released. However, in the graph i, since a difference between a maximum angular velocity and a minimum angular velocity is greater than the second limit value LIMIT#2 from a time t4 at which the user lifts the digital camera 1 from the tripod to the second time TIME#2, the sleep mode is released.

Thus, according to the invention, the sleep mode is not easily released due to a small shake of the tripod, the user's operation, vibration inside the digital camera 1, and the like when the sleep mode is turned on, and the hand shake correction operation is not performed so that power consumption may be reduced.

Figure 8:
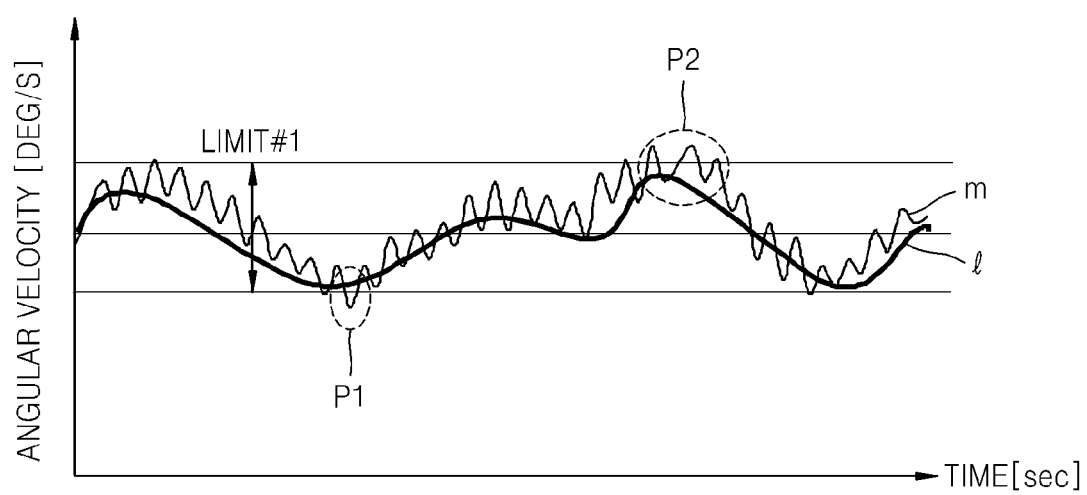
FIG. 8 is a graph showing an angular velocity that is obtained by removing noise included in measurement of a vibration degree.

FIG. 8 is a graph showing an angular velocity that is obtained by removing noise included in measurement of a vibration degree. The x-axis of FIG. 8 represents time, and the y-axis thereof represents angular velocity.

According to an embodiment of the invention, when the vibration degree of the digital camera 1 is measured, noise included in the vibration degree may be removed by using a low pass filter (LPF). The vibration detection sensor 102, which measures the vibration degree, measures the angular velocity and noise due to a random working phenomenon and precision of a sensor even when there is no vibration like an m-waveform. However, due to the noise, a difference between a maximum angular velocity and a minimum angular velocity is greater than the first limit value LIMIT#1, like in points P1 and P2, the sleep mode of the digital camera 1 may not be turned on from the state where the sleep mode of the digital camera 1 is turned off. To solve the problem, the angular velocity is obtained by removing the noise included in the measurement of the vibration degree and thus may be obtained like in a graph I. In conclusion, the accuracy of the method of controlling the sleep mode may be improved using the LPF.

Figure 9:
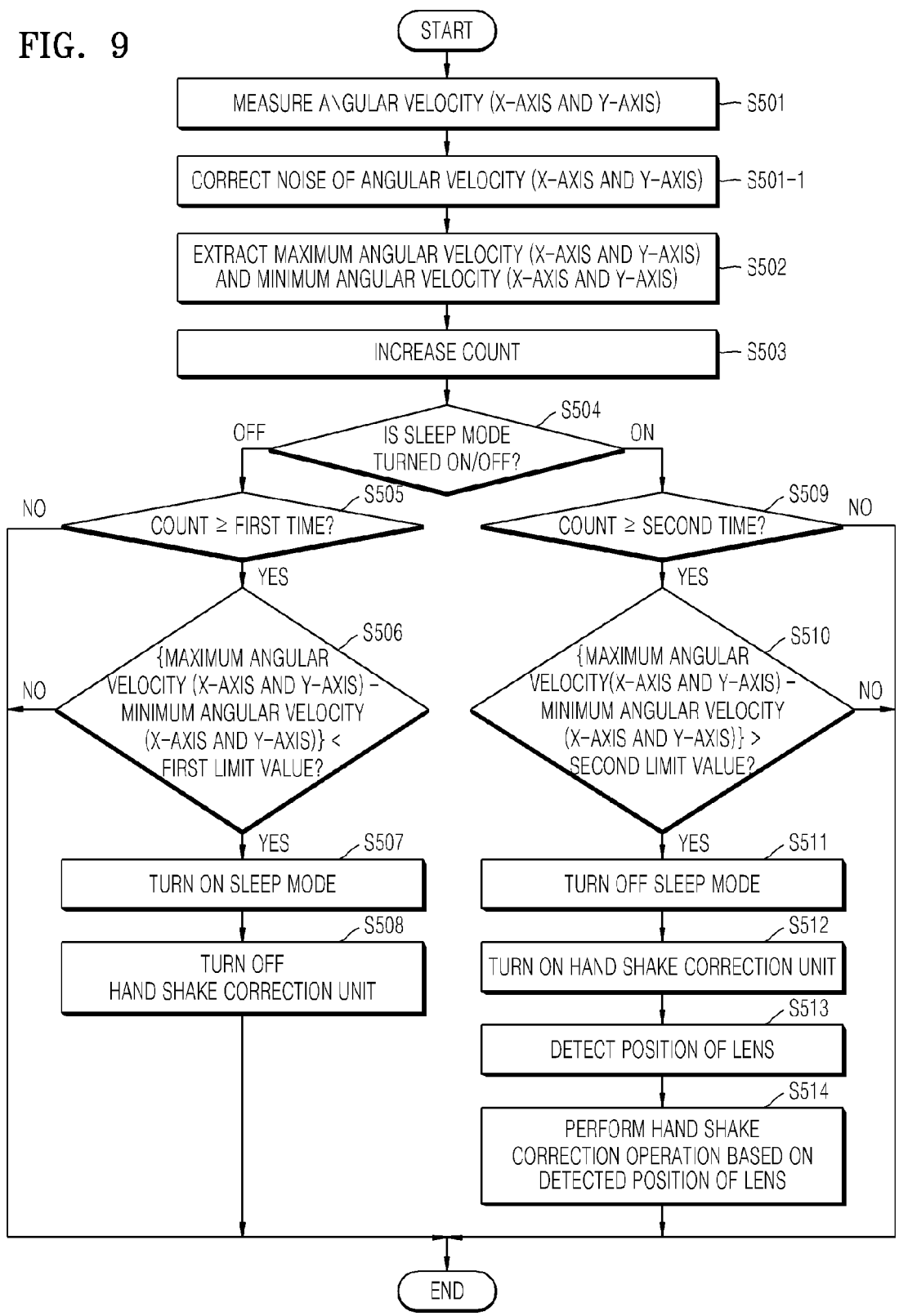
FIG. 9 illustrates a modified example of FIG. 5.

FIG. 9 illustrates a modified example of FIG. 5. Referring to FIG. 9, noise included in the measured vibration degree is corrected using the LPF. In other words, Operation S501-1 of filtering the angular velocity measured by the vibration detection sensor 102 is added. Other operations are the same as those described with reference to FIG. 5, and thus, a detailed description thereof will not be repeated here.

Figure 10:
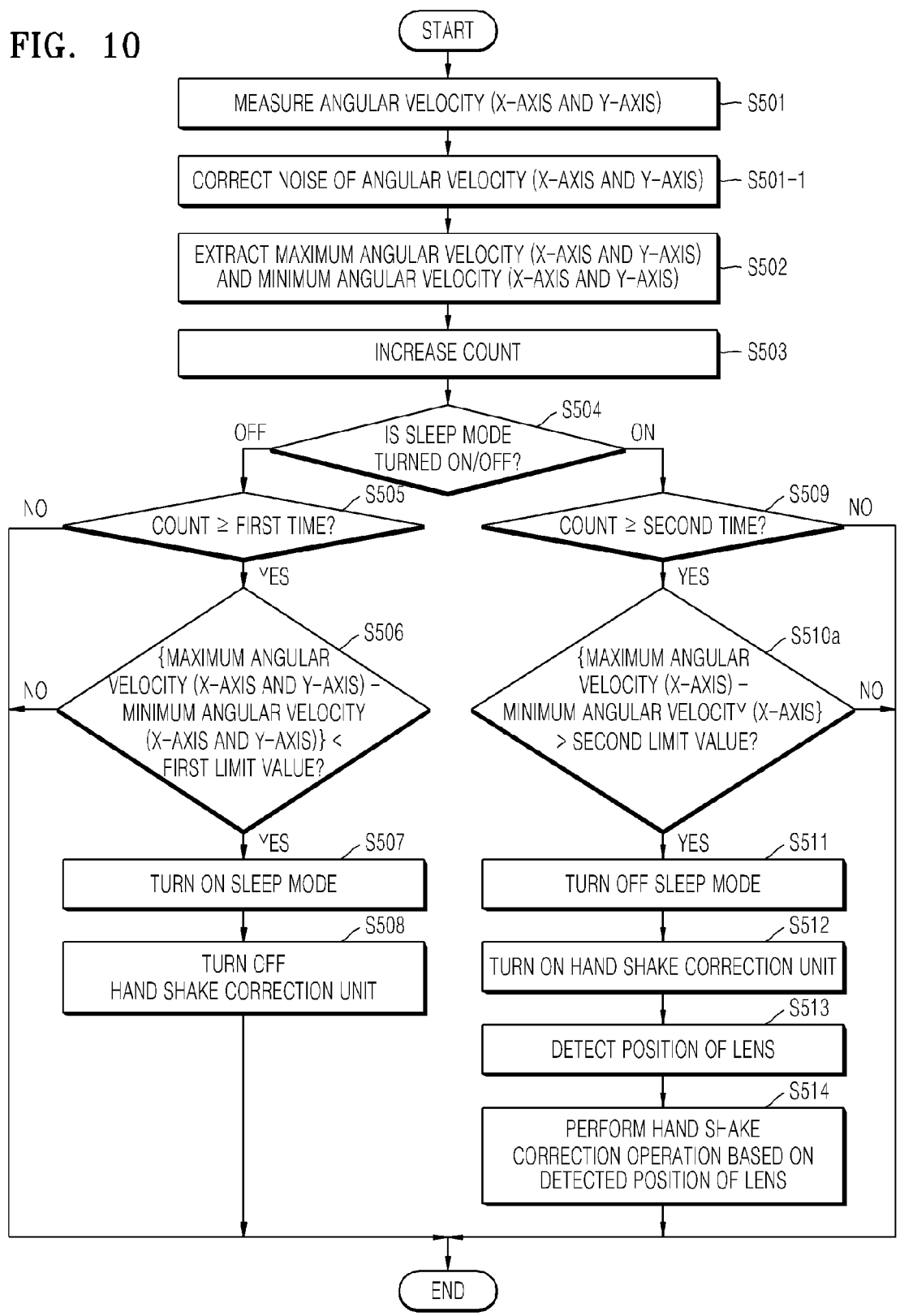
FIG. 10 illustrates another modified example of FIG. 9.

FIG. 10 illustrates a modified example of FIG. 9. Referring to FIG. 10, when the comparison unit 32 compares the measured vibration degree with the second limit value LIMIT#2 in Operation S510 of FIG. 9, the vibration degree in the x-axis direction and the second limit value LIMIT#2 are compared with each other (Operation S510a). In FIG. 5, the angular velocity in the x-axis direction and the angular velocity in the y-axis direction are simultaneously detected, and the sleep mode is released when both the angular velocity in the x-axis direction and the angular velocity in the y-axis direction are greater than the second limit value LIMIT#2. However, in FIG. 10, the sleep mode is released when a difference between the maximum angular velocity and the minimum angular velocity in the x-axis direction is greater than the second limit value LIMIT#2. This is because, when the digital camera 1 is put on the tripod, since a change in the angular velocity in the y-axis direction is greater than a change in the angular velocity in the x-axis direction, the angular velocity in the x-axis direction may be detected in order to prevent the sleep mode from being easily turned off. Other operations are the same as those described with reference to FIG. 5, and thus, a detailed description thereof will not be repeated here.

Figure 11:
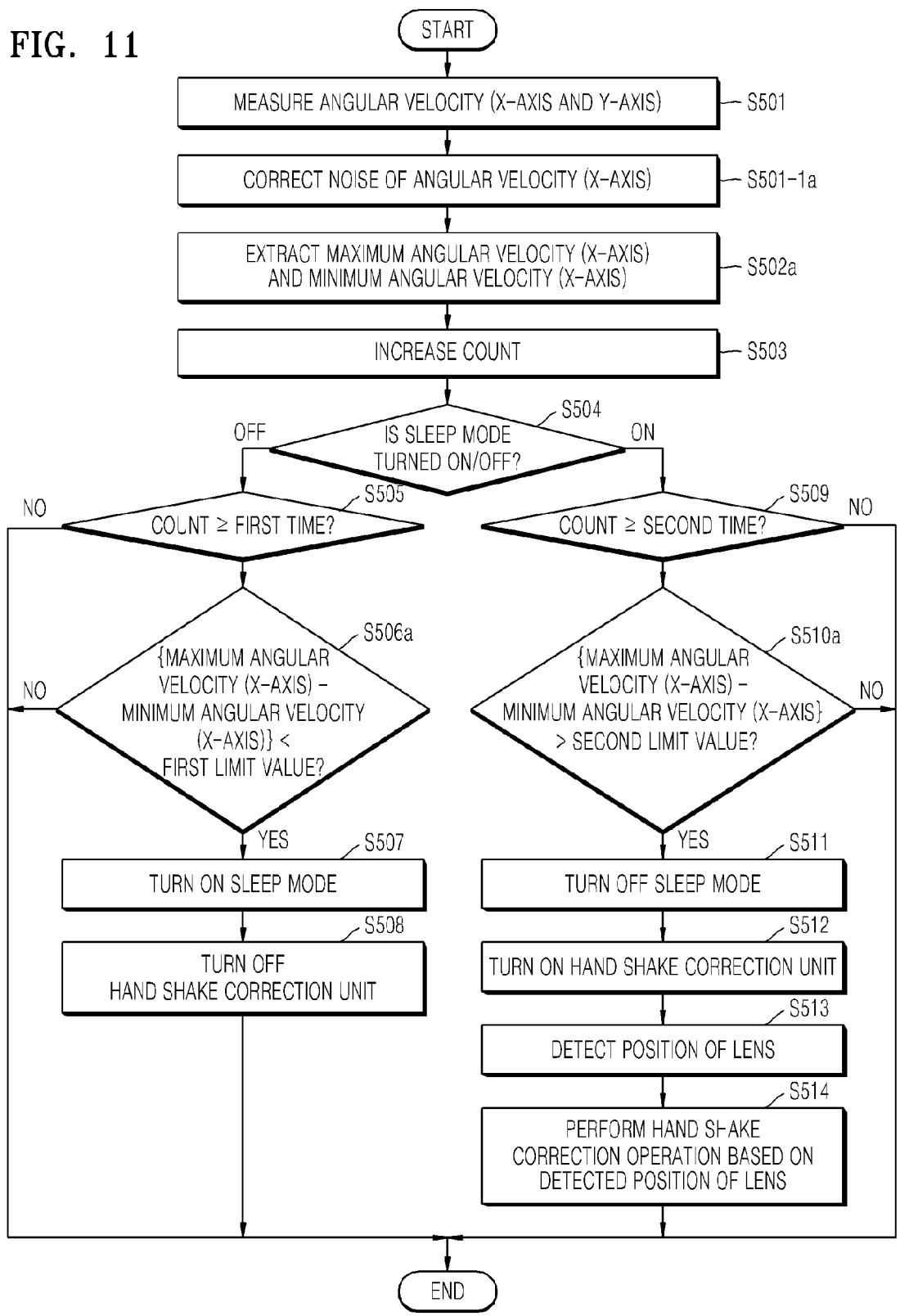
FIG. 11 illustrates another modified example of FIG. 10.

FIG. 11 illustrates a modified example of FIG. 10. Referring to FIG. 11, the measured vibration degree is limited to the vibration degree in the x-axis direction (Operations S501a, S502a, S506a, and S510a). Other operations are the same as those described with reference to FIG. 5, and thus, a detailed description thereof will not be repeated here.

Figure 12:
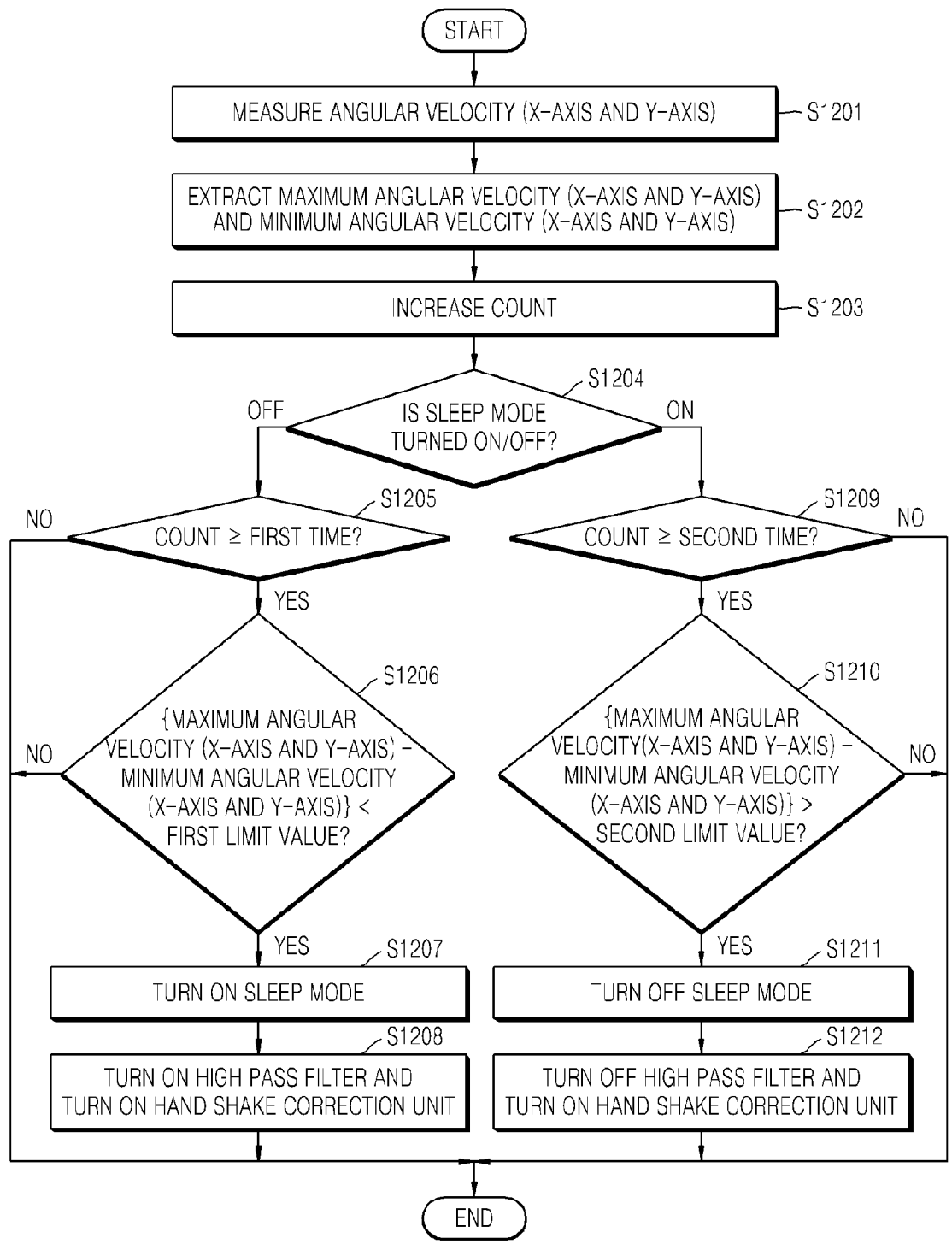
FIG. 12 is a flowchart illustrating a method of controlling a sleep mode, according to another embodiment of the invention.

According to another embodiment of the invention, a method of reasonably controlling a sleep mode by turning on/off a HPF is provided. FIG. 12 is a flowchart illustrating a method of controlling a sleep mode, according to another embodiment of the invention.

FIG. 12 is different from FIG. 5 in that Operations S1211 and S1212 of FIG. 12 are different from FIG. 5 and other operations are the same as or similar to those of FIG. 5. Thus, only the difference therebetween will be described in detail and a repeated description thereof will not be provided here.

First, a vibration degree is detected by the vibration detection sensor 102. Next, a maximum angular velocity and a minimum angular velocity are extracted from the vibration degree (Operation S1202). Next, in order to measure the vibration degree of the digital camera 1 for a predetermined amount of time, a count is increased by a predetermined size (Operation S1203). Next, the checking unit 31 of the DSP 30 checks whether the sleep mode of the digital camera 1 is turned on or off (Operation S1204). The order of the checking whether the sleep mode is turned on/off (Operation S1204) and the increasing of the count (Operation S1203) may be changed. if the checking unit 31 determines that the sleep mode is turned off, the comparison unit 32 compares the vibration degree measured for a first time TIME#1 with a first limit value LIMIT#1. Thus, it is first checked whether the count is greater than or equal to the first time TIME#1 (Operation S1205). If the count is less than the first time TIME#1, controlling of the sleep mode is stopped, and if the count is greater than or equal to the first time TIME#1, the vibration degree measured for the first time TIME#1, for example, a difference between a maximum angular velocity and a minimum angular velocity in the x-axis direction or the y-axis direction {MAX ANGVEL X&Y−MIN ANGANGVEL X&Y} is compared with the first limit value LIMIT#1 (Operation S1206).

As a result of comparison of the comparison unit 32, if the vibration degree is less than the first limit value LIMIT#1, the controller 33 turns on the sleep mode (Operation S1207). According to another embodiment of the invention, if the sleep mode is turned on, the HPF 123 is turned on, and the hand shake correction unit 100 is turned on (Operation S1208). The HPF 123 is included in the hand shake correction unit 100 and allows the hand shake correction unit 100 to operate only for specific vibration. For example, a cut off frequency of the HPF 123 may be about 3 to 8 Hz. In this regard, the hand shake correction unit 100 performs a hand shake correction operation only for a shock caused by pushing the release button 52 or a shock caused by operating the shutter. Thus, according to another embodiment of the invention, a clear image that is not affected by vibration caused by an operation that inevitably occurs during photographing may be obtained.

If the checking unit 31 determined that the sleep mode is turned on in S504, the comparison unit 32 compares the vibration degree measured for the second time TIME#2 and a second limit value LIMIT#2. Thus, it is first checked whether the count is greater than or equal to the second time TIME#1 (Operation S1209). If the count is less than the second time (TIME#2), controlling of the sleep mode is stopped, and if the count is greater than or equal to the second time TIME#2, the vibration degree measured for the second time TIME#2, for example, the difference between the maximum angular velocity and the minimum angular velocity in the x-axis direction or the y-axis direction {MAX ANGVEL X&Y−MIN ANGANGVEL X&Y} is compared with the second limit value LIMIT#2 (Operation S1210).

As a result of comparison of the comparison unit 52, if the vibration degree is greater than the second limit value LIMIT#2, the controller 33 turns off the sleep mode (Operation S1211). According to another embodiment of the invention, if the sleep mode is turned off, the HPF 123 is turned off, and the hand shake correction unit 100 is turned on (Operation S1212). In detail, since the HPF 123 is turned off, the hand shake correction operation may be performed even in the case of small vibration.

Figure 13:
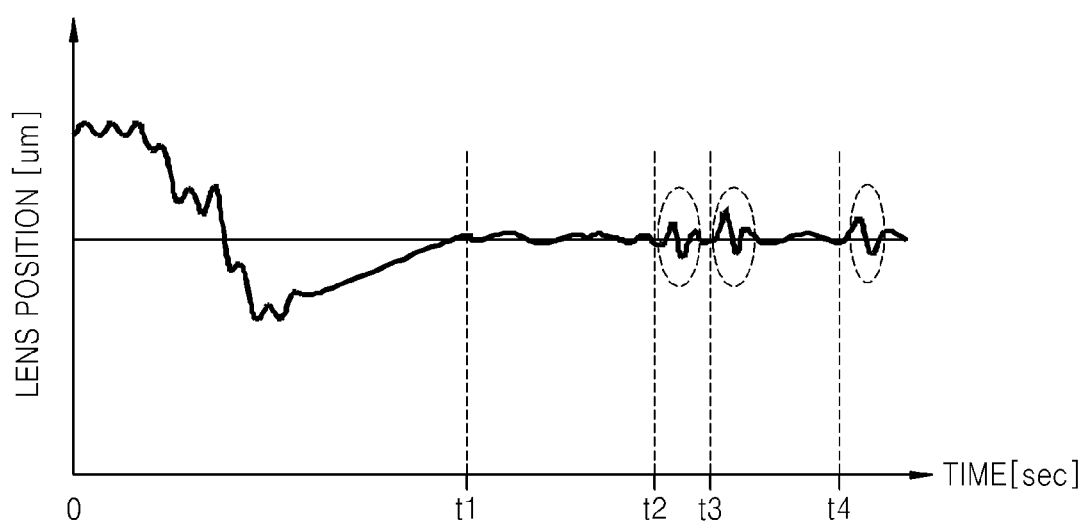
FIG. 13 is a graph for explaining the method of controlling a sleep mode illustrated in FIG. 12.

FIG. 13 is a graph for explaining the method of controlling a sleep mode illustrated in FIG. 12. Referring to FIG. 13, the x-axis represents time, and the y-axis represents the position of the lens. If the position of the lens is changed a relatively large amount within a short period of time, a vibration degree is relatively large. Also, if the position of the lens is changed a relatively small amount within a short period of time, the vibration degree is relatively small. Since the user grips the digital camera 1 before a time t1, the position of the lens is greatly changed. In this case, the sleep mode is turned off. Since the user puts the digital camera 1 on the tripod in a time period between the time t1 and a time t2, the position of the lens is hardly changed. In this case, the sleep mode is turned on. A time period between the time t2 and a time t3 refers to when the user half presses the release button 52, and a time period between the time t3 and a time t4 refers to when the user completely presses the release button 52, and a time period after the time t4 refers to when the shutter operates. According to the method of controlling a sleep mode illustrated in FIG. 13, when, in a time period after t2, the sleep mode is turned on or the HPF 123 is turned on, the hand shake correction unit 100 operates. In this regard, the cut off frequency of the HPF 123 is set to operate the hand shake correction unit 100 for vibration that occurs due to a shock caused by pushing the release button 52 or a shock caused by operating the shutter. Thus, the hand shake correction operation is performed in the time periods between the time t2 and the time t3, the time t3 and the time t4, and the time period after the time t4.

Figure 14:
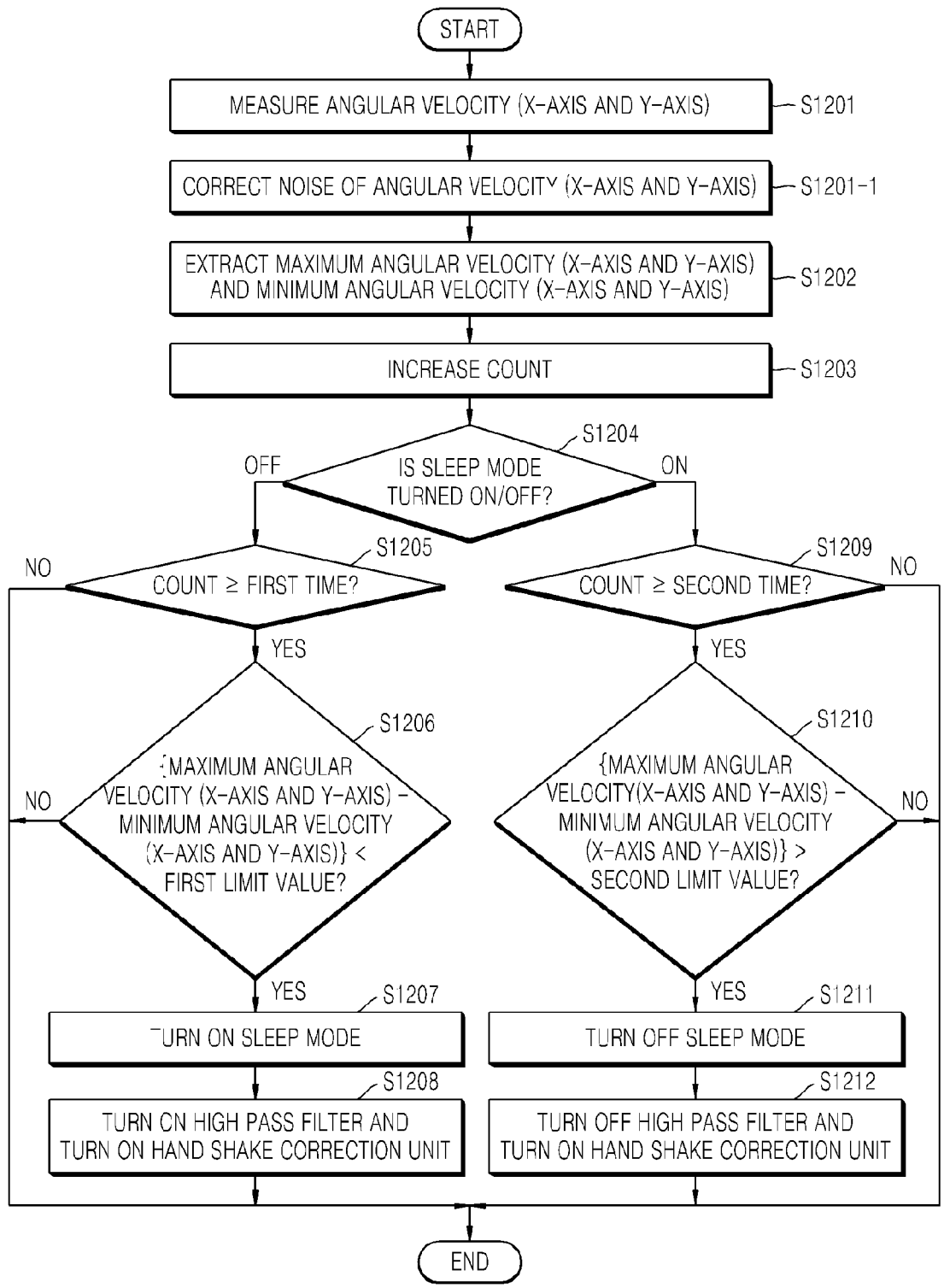
FIG. 14 illustrates a modified example of FIG. 12.

FIG. 14 illustrates a modified example of FIG. 12. Referring to FIG. 14, noise included in the measured vibration degree is corrected using the LPF (Operation S1201-1). Other operations are the same as those described with reference to FIG. 12, and thus, a detailed description thereof will not be repeated here.

Figure 15:
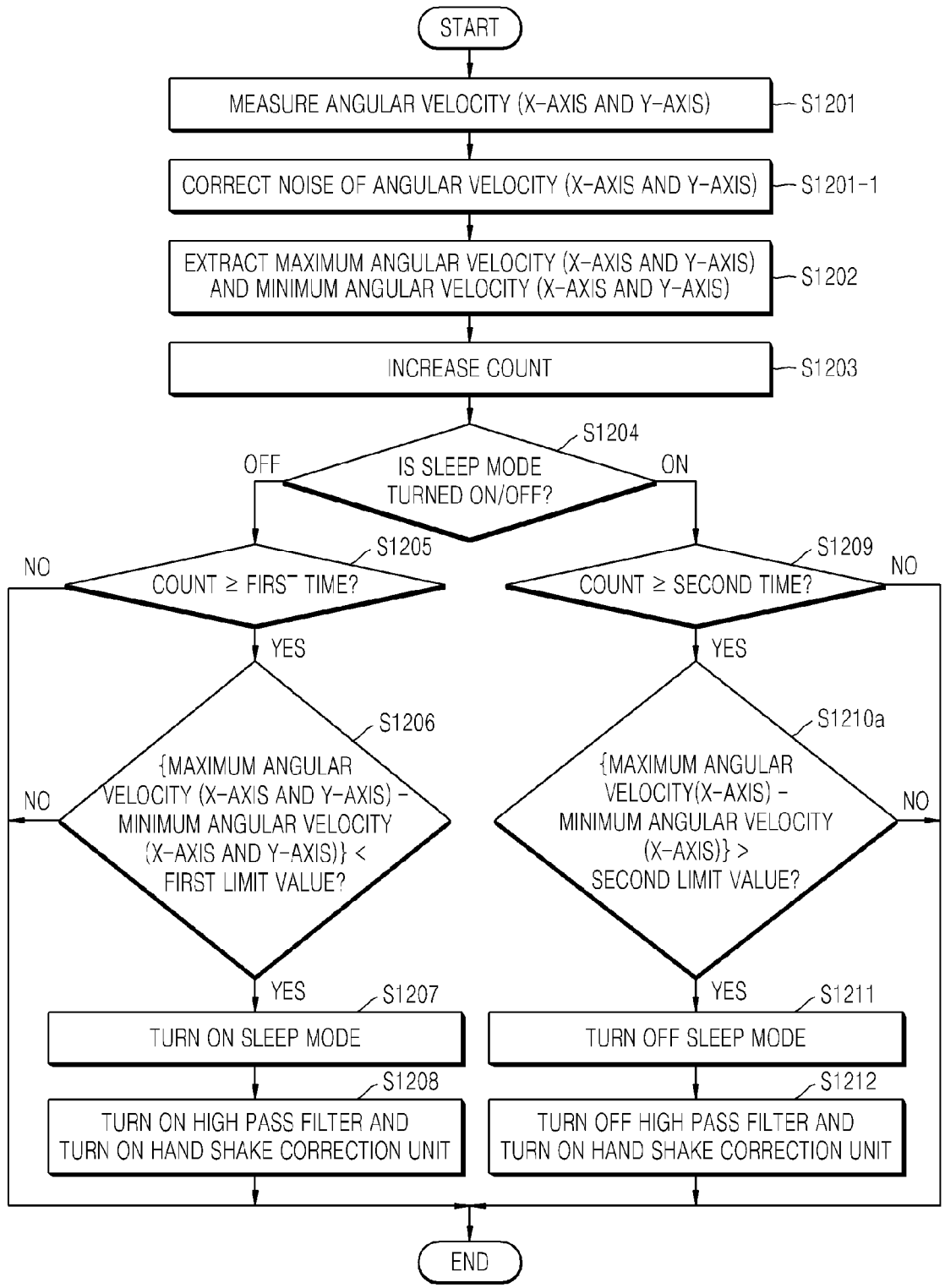
FIG. 15 illustrates another modified example of FIG. 14.

FIG. 15 illustrates another modified example of FIG. 14. Referring to FIG. 15, when the comparison unit 32 compares the measured vibration degree with the second limit value LIMIT#2 in Operation S1210 of FIG. 14, the vibration degree in the x-axis direction and the second limit value LIMIT#2 are compared with each other (Operation S1210*a*). Other operations are the same as those described with reference to FIG. 12, and thus, a detailed description thereof will not be repeated here.

Figure 16:
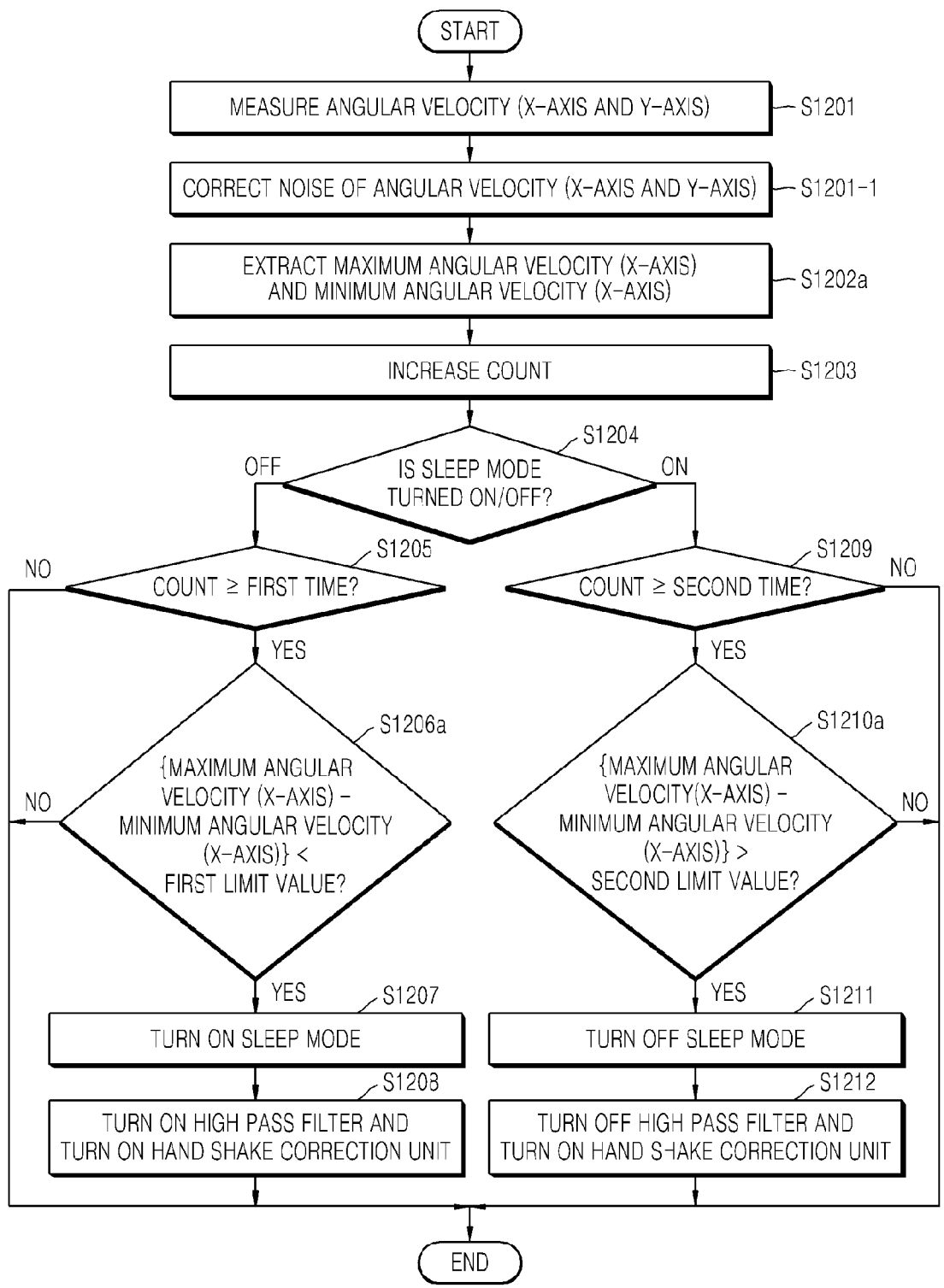
FIG. 16 illustrates another modified example of FIG. 15.

FIG. 16 illustrates another modified example of FIG. 15. Referring to FIG. 16, the measured degree of vibration is limited to the vibration degree in the x-axis direction (Operations S1201*a*, S1202*a*, S1206*a*, and S1210*a*). Other operations are the same as those described with reference to FIG. 12, and thus, a detailed description thereof will not be repeated here.

According to an embodiment of the invention, when a sleep mode is turned off, if vibration less than a predetermined limit value occurs, the sleep mode is turned on and a hand shake correction unit is turned off so that power consumption can be reduced. In addition, when the sleep mode is turned on, if vibration greater than a predetermined limit value occurs, the sleep mode is turned off and the hand shake correction unit is turned on so that an image blur does not occur.

According to another embodiment of the invention, when the sleep mode is turned off, if vibration less than a predetermined limit value occurs, the hand shake correction unit is turned on in the state where the sleep mode is turned on and a HPF is turned on so that an image blur can be prevented from occurring due to a shock caused by pushing a release button or shock caused by opening or closing a shutter.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. The computer readable recording medium may be limited to non-transitory computer readable recording medium.

Also, functional programs, codes, and code segments for accomplishing the invention can be easily construed by programmers skilled in the art to which the invention pertains.

As the invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the invention. In the description of the invention, certain detailed explanations of related art are omitted when it is deemed that they may unnecessarily obscure the essence of the invention.

While such terms as "first," "second," etc., may be used to describe various components, such components must not be limited to the above terms. The above terms are used only to distinguish one component from another.

The terms used in the specification are merely used to describe particular embodiments, and are not intended to limit the invention. An expression used in the singular encompasses the expression of the plural, unless it has a clearly different meaning in the context. In the current specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

While this invention has been particularly shown and described with reference to preferred embodiments thereof, it will be understood by those of ordinary skill in the art that various changes in form and details may be made therein without departing from the spirit and scope of the invention as defined by the appended claims. The preferred embodiments should be considered in a descriptive sense only and not for purposes of limitation. Therefore, the scope of the invention is defined not by the detailed description of the invention but by the appended claims, and all differences within the scope will be construed as being included in the invention.

All references, including publications, patent applications, and patents, cited herein are hereby incorporated by reference to the same extent as if each reference were individually and specifically indicated to be incorporated by reference and were set forth in its entirety herein.

What is claimed is:

1. A method of controlling a sleep mode of a digital photographing apparatus comprising a hand shake correction unit, the method comprising:
   measuring a vibration degree of the digital photographing apparatus;
   checking whether the sleep mode of the digital photographing apparatus is turned on or off;
   if the sleep mode is turned off, comparing the vibration degree measured for a first time with a first limit value;
   if the vibration degree is less than the first limit value, turning on the sleep mode;
   if the sleep mode is turned on, comparing the vibration degree measured for a second time with a second limit value;
   if the vibration degree is greater than the second limit value, turning off the sleep mode;
   when the sleep mode is turned on, performing a hand shake correction operation only for vibrations of at least a predetermined size; and
   when the sleep mode is turned off, performing a hand shake correction operation for all vibrations.

2. The method of claim 1, wherein, if the sleep mode is turned on, the hand shake correction unit is turned on in a state where a high pass filter (HPF) is turned on, and if the sleep mode is turned off, the hand shake correction unit is turned on in a state where the HPF is turned off.

3. The method of claim 2, wherein the HPF is included in the hand shake correction unit, and the hand shake correction unit is configured to only operate for a shock caused by pushing a release button or a shock caused by opening or closing a shutter.

4. The method of claim 1, wherein the vibration degree is determined based on a difference between a maximum angular velocity and a minimum angular velocity, and the vibration degree comprises a vibration degree in an x-axis direction and a vibration degree in a y-axis direction.

5. The method of claim 4, wherein the comparing of the measured vibration degree with the second limit value comprises comparing the vibration degree in the x-axis direction with the second limit value.

6. The method of claim 1, wherein the degree of vibration is determined based on a difference between a maximum angular velocity and a minimum angular velocity, and the vibration degree comprises only a vibration degree in the x-axis direction.

7. The method of claim 1, wherein the first time is longer than the second time.

8. The method of claim 1, wherein the first limit value is less than the second limit value.

9. The method of claim 1, further comprising, if the sleep mode is turned off and the hand shake correction unit is turned on:
   extracting information regarding a current position of a lens, wherein the extracting of information is performed by the hand shake correction unit; and
   starting performing of a hand shake correction operation based on the extracted current position of the lens, wherein the performing of the hand shake correction operation is performed by the hand shake correction unit.

10. The method of claim 1, further comprising:
    removing noise included in the vibration degree by using a low pass filter (LPF).

11. The method of claim 1 further comprising detecting a current position of a lens, wherein:
    if the sleep mode is turned on, the hand shake correction unit is turned off, and if the sleep mode is turned off, the hand shake correction unit is turned on; and
    the hand shake correction unit corrects hand shake by moving at least one lens of the digital photographing apparatus based on the detected current position of the lens.

12. A digital photographing apparatus comprising a hand shake correction unit, the digital photographing apparatus comprising:
    a vibration detection sensor included in the hand shake correction unit and configured to measure a vibration degree of the digital photographing apparatus;
    a checking unit configured to check whether a sleep mode of the digital photographing apparatus is turned on or off;
    a comparison unit configured to check the sleep mode, and, if the sleep mode is turned off, compare the vibration degree measured for a first time with a first limit value, and if the sleep mode is turned on, compare the vibration degree measured for a second time with a second limit value; and
    a controller configured to, if the vibration degree measured for the first time is less than the first limit value, turn on the sleep mode, and if the vibration degree measured for the second time is greater than the second limit value, turn off the sleep mode;

wherein the handshake correction unit is configured to, if the sleep mode is turned on, perform a handshake correction operation only for vibrations of at least a predetermined size, and if the sleep mode is turned off, perform a handshake correction operation for all vibrations.

13. The digital photographing apparatus of claim 12, wherein the controller is further configured to: if the sleep mode is turned on, the controller turns on the hand shake correction unit in a state where a high pass filter (HPF) is turned on, and if the sleep mode is turned off, the controller turns on the hand shake correction unit in a state where the HPF is turned off.

14. The digital photographing apparatus of claim 13, wherein the hand shake correction unit comprises the HPF, and the hand shake correction unit is configured to operate only for a shock caused by pushing a release button or a shock caused by opening or closing a shutter.

15. The digital photographing apparatus of claim 12, wherein the vibration degree is determined based on a difference between a maximum angular velocity and a minimum angular velocity, and the vibration degree comprises a vibration degree in an x-axis direction and a vibration degree in a y-axis direction.

16. The digital photographing apparatus of claim 15, wherein the comparison unit is further configured to compare the vibration degree in the x-axis direction with the second limit value.

17. The digital photographing apparatus of claim 12, wherein the degree of vibration is determined based on a difference between a maximum angular velocity and a minimum angular velocity, and the vibration degree comprises only a vibration degree in the x-axis direction.

18. The digital photographing apparatus of claim 12, wherein the first time is longer than the second time.

19. The digital photographing apparatus of claim 12, wherein the first limit value is less than the second limit value.

20. The digital photographing apparatus of claim 12, further comprising a position detection sensor configured to extract information regarding a current position of a lens included in the digital photographing apparatus, wherein the hand shake correction unit is further configured to start to perform a hand shake correction operation based on the extracted current position of the lens extracted by the position detection sensor after the sleep mode is turned off.

21. The digital photographing apparatus of claim 12, further comprising a low pass filter (LPF) included in the hand shake correction unit and configured to remove noise included in the vibration degree of the digital photographing apparatus.

22. The digital photographing apparatus of claim 12 further comprising a lens position detection sensor configured to detect a current position of a lens, wherein:

the controller is further configured to: if the sleep mode is turned on, the controller turns off the hand shake correction unit, and if the sleep mode is turned off, the controller turns on the hand shake correction unit, and the hand shake correction unit corrects hand shake by moving at least one lens of the digital photographing apparatus based on the detected current position of the lens.

* * * * *